United States Patent
Cakmakci et al.

(10) Patent No.: US 9,335,548 B1
(45) Date of Patent: May 10, 2016

(54) HEAD-WEARABLE DISPLAY WITH COLLIMATED LIGHT SOURCE AND BEAM STEERING MECHANISM

(71) Applicant: Google Inc., Mountain View, CA (US)

(72) Inventors: Ozan Cakmakci, Sunnyvale, CA (US); Anurag Gupta, Los Gatos, CA (US)

(73) Assignee: Google Inc., Mountain View, CA (US)

( * ) Notice: Subject to any disclaimer, the term of this patent is extended or adjusted under 35 U.S.C. 154(b) by 63 days.

(21) Appl. No.: 13/972,782

(22) Filed: Aug. 21, 2013

(51) Int. Cl.
| | |
|---|---|
| *G02B 27/01* | (2006.01) |
| *G02B 26/00* | (2006.01) |
| *G02B 27/00* | (2006.01) |
| *G02F 1/29* | (2006.01) |
| *G06F 3/01* | (2006.01) |

(52) U.S. Cl.
CPC .......... *G02B 27/0172* (2013.01); *G02B 26/005* (2013.01); *G02B 27/0093* (2013.01); *G02F 1/292* (2013.01); *G06F 3/013* (2013.01)

(58) Field of Classification Search
CPC ........... G02B 27/0172; G02B 27/0093; G02B 26/005; G02F 1/292; G06F 3/013
See application file for complete search history.

(56) References Cited

U.S. PATENT DOCUMENTS

| | | | |
|---|---|---|---|
| 6,181,475 B1 | 1/2001 | Togino et al. | |
| 6,384,983 B1 | 5/2002 | Yamazaki et al. | |
| 2005/0180687 A1* | 8/2005 | Amitai | 385/31 |
| 2006/0028400 A1 | 2/2006 | Lapstun et al. | |
| 2010/0046070 A1* | 2/2010 | Mukawa | G02B 27/0176 359/480 |
| 2010/0149073 A1* | 6/2010 | Chaum et al. | 345/8 |
| 2010/0157026 A1* | 6/2010 | Reichelt | 348/51 |
| 2011/0013245 A1* | 1/2011 | Tanaka | G02B 26/105 359/201.2 |
| 2011/0122467 A1* | 5/2011 | Futterer et al. | 359/9 |
| 2012/0218481 A1 | 8/2012 | Popovich et al. | |
| 2013/0127980 A1 | 5/2013 | Haddick et al. | |

OTHER PUBLICATIONS

Cakmakci, Ozan et al., "Head-Worn Displays: A Review", Journal of Display Technology, vol. 2, No. 3, IEEE, Sep. 2006, pp. 199-216.
Smith, N.R. et al., "Experimental Validation of >1 kHz Electrowetting Modulation", University/Government/Industry Micro/Nano Symposium, 2008, UGIM 2008, 17th Biennial, IEEE, pp. 11-14.
McManamon, Paul F. et al., "A Review of Phased Array Steering for Narrow-Band Electrooptical Systems", Invited Paper, Proceedings of the IEEE, vol. 97, No. 6, Jun. 2009, pp. 1078-1096.

(Continued)

*Primary Examiner* — Liliana Cerullo
(74) *Attorney, Agent, or Firm* — Blakely Sokoloff Taylor & Zafman LLP (57) ABSTRACT

A head-wearable display includes a collimated light source, a beam steering mechanism, and a synchronization controller. The collimated light source selectively emits collimated light. The beam steering mechanism is optically coupled to receive the collimated light and angularly scans the collimated light between beam steering states that each redirect the collimate light to a different angular direction along at least one angular dimension. The beam steering mechanism is coupled to scan the collimated light across an eyebox. The synchronization controller is coupled to the collimated light source and the beam steering mechanism to synchronize selective emission of the collimated light from the collimated light source with the beam steering states of the beam steering mechanism to repetitiously draw an image in the eyebox.

27 Claims, 9 Drawing Sheets

(56) References Cited

OTHER PUBLICATIONS

Gao Renxi et al., "The Composite Structure of Hologram and Optical Waveguide", www.intechopen.com, Holography, Research and Technologies, Published online Feb. 28, 2011, pp. 109-132.

Epson, "Moverio™ BT-100 Wearable Display", Model: V11H423020, 2 pages downloaded from Internet on Aug. 21, 2013, <http://www.epson.com/cgi-in/Store/jsp/Product.do?sku=V11H423020#product-info>.

* cited by examiner

HEAD-WEARABLE DISPLAY WITH COLLIMATED LIGHT SOURCE AND BEAM STEERING MECHANISM

TECHNICAL FIELD

This disclosure relates generally to the field of optics, and in particular but not exclusively, relates to head-wearable displays.

BACKGROUND INFORMATION

A head-wearable or head-mounted display ("HMD") is a display device worn on or about the head. HMDs usually incorporate some sort of near-to-eye optical system to display an image within a few centimeters of the human eye. Single eye displays are referred to as monocular HMDs while dual eye displays are referred to as binocular HMDs. Some HMDs display only a computer generated image ("CGI"), while other types of HMDs are capable of superimposing a computer generated image ("CGI") over a real-world view. This latter type of HMD is often referred to as augmented reality because the viewer's image of the world is augmented with an overlaying CGI, also referred to as a heads-up display ("HUD").

One goal of designing HMDs is to have the device disappear from an observer point of view. Conventional HMDs are implemented with a light source that emits display light initially having a cone of divergence. In order to bring this display light into focus in a near-to-eye configuration, optics are used to collimate or nearly collimate this divergent light. These optics are typically implemented using one or more reflective, refractive, or diffractive lenses. These conventional optical elements typically must tradeoff bulk and size with field of view, eyebox, and spectral bandwidth.

HMDs have numerous practical and leisure applications. Aerospace applications permit a pilot to see vital flight control information without taking their eye off the flight path. Public safety applications include tactical displays of maps and thermal imaging. Other application fields include video games, transportation, and telecommunications. Due to the infancy of this technology, there is certain to be new found practical and leisure applications as the technology evolves; however, many of these applications are limited due to the cost, size, field of view, and efficiency of conventional optical systems used to implement existing HMDs.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

DETAILED DESCRIPTION

Embodiments of a system, apparatus, and method of operation for head-wearable display implemented with beam steering are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1:
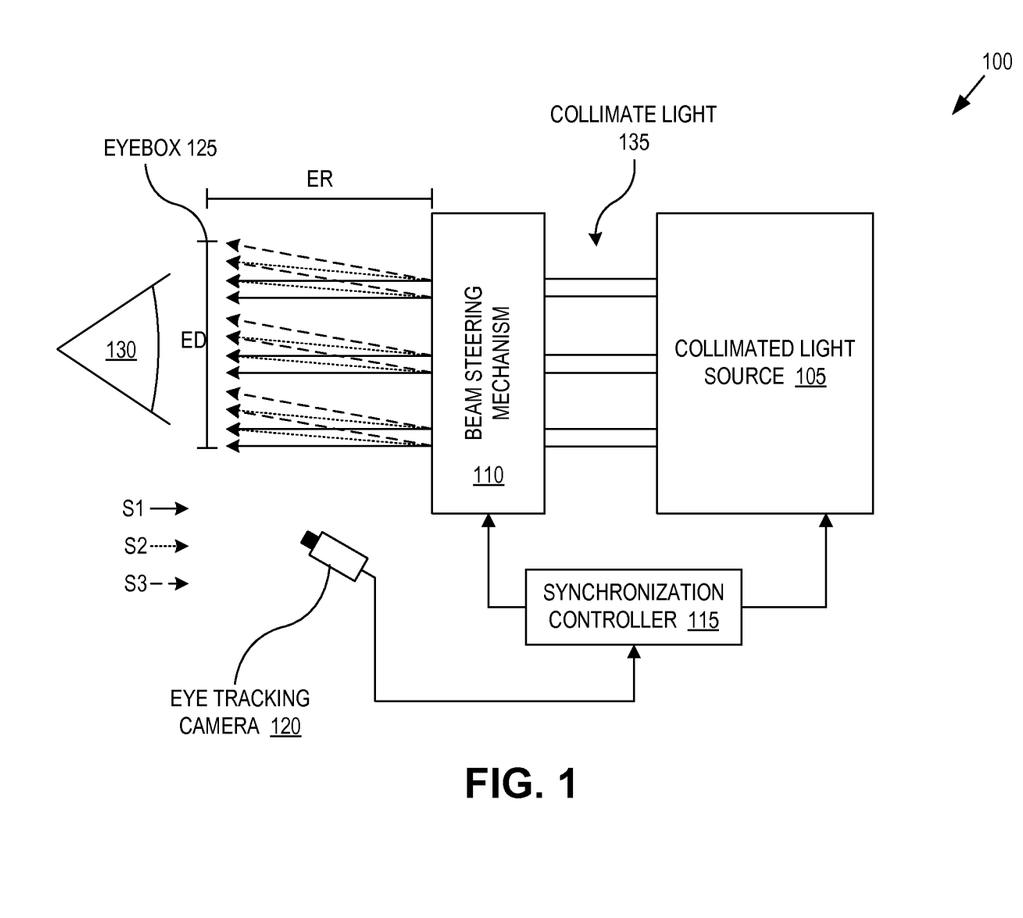
FIG. 1 is a functional block diagram illustrating a head-wearable display system with a collimated light source synchronized to a beam steering mechanism, in accordance with an embodiment of the disclosure.

FIG. 1 is a functional block diagram illustrating a system 100 for implementing a head-wearable display with a collimated light source synchronized to a beam steering mechanism, in accordance with an embodiment of the disclosure. The illustrated embodiment of system 100 includes a collimated light source 105, a beam steering mechanism 110, a synchronization controller 115, and an optional eye tracking camera 120.

System 100 operates to repetitiously draw an image into an eyebox 125 to be aligned with an eye 130. The image is drawn by synchronizing the emission of collimated light 135 from collimated light source 105 with the beam steering induced by beam steering mechanism 110. Beam steering mechanism 110 repetitiously scans through beam steering states (e.g., S1, S2, S3 . . . ) that each direct collimated light 135 towards a different angular direction while maintaining the collimated nature of collimated light 135 that reaches eye 130.

All collimated light that reaches eye 130 from a given angle is focused by eye 130 to a point and thus represents a given point or pixel within an image. By pulsing collimated light source 105 on and off in synchronization with the currently selected beam steering state of beam steering mechanism 110 an image can be drawn into eyebox 125 with a field of view (e.g., eight degrees). When this image is repetitiously redrawn, eye 130 will perceive a substantially constant image. The image can be updated and changed by changing the on/off synchronization between collimated light source 105 and beam steering mechanism 110. In one embodiment, synchronization controller 115 is a microcontroller coupled to control collimated light source 105 and beam steering mechanism 110 according to executable instructions (e.g., software/firmware instructions).

In one embodiment, synchronization controller 115 is further coupled to an eye tracking camera 120 to determine the gazing direction of eye 130 and increase the field of view ("FOV") of system 100. This gaze tracking mechanism is described in greater detail below in connection with FIG. 4.

Collimated light source 105 may be implemented in a variety of different manners. For example, collimated light source 105 may be implemented using one or more divergent light sources (e.g., LEDs, OLEDs, lasers, or otherwise) that are collimated with optics (e.g., refractive, reflective, or diffractive lens elements), if necessary. The divergent light source may be directly switched on and off or external optical elements used to modulate the emitted light.

Figure 2A:
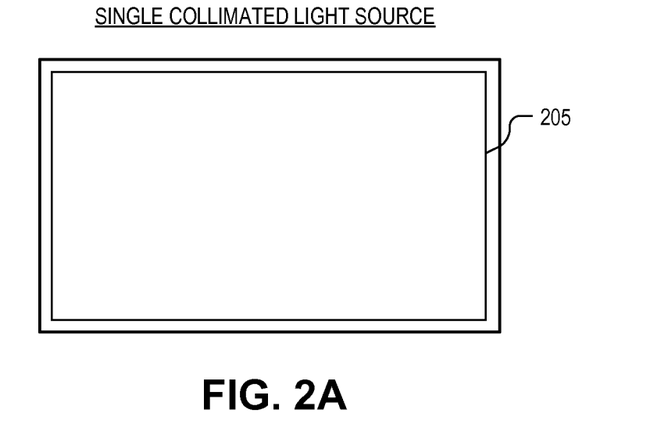
FIGS. 2A-C illustrate plan views of different emission patterns of collimated light that can be emitted by a collimated light source, in accordance with embodiments of the disclosure.
Figure 2B:
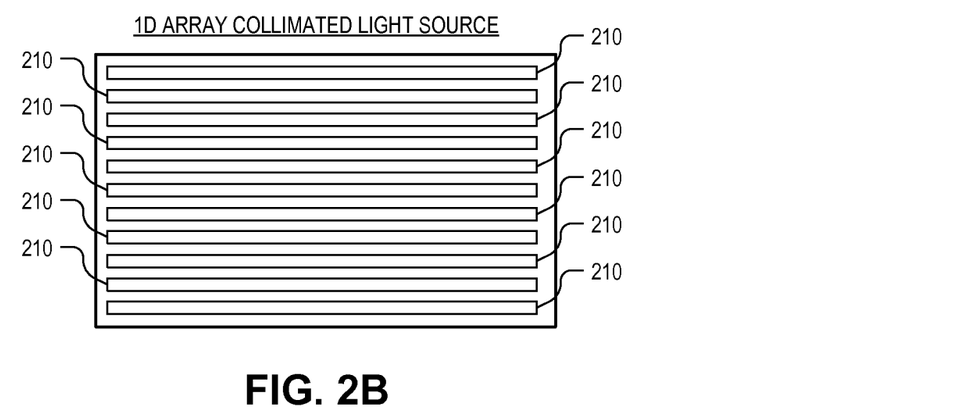
Figure 2C:
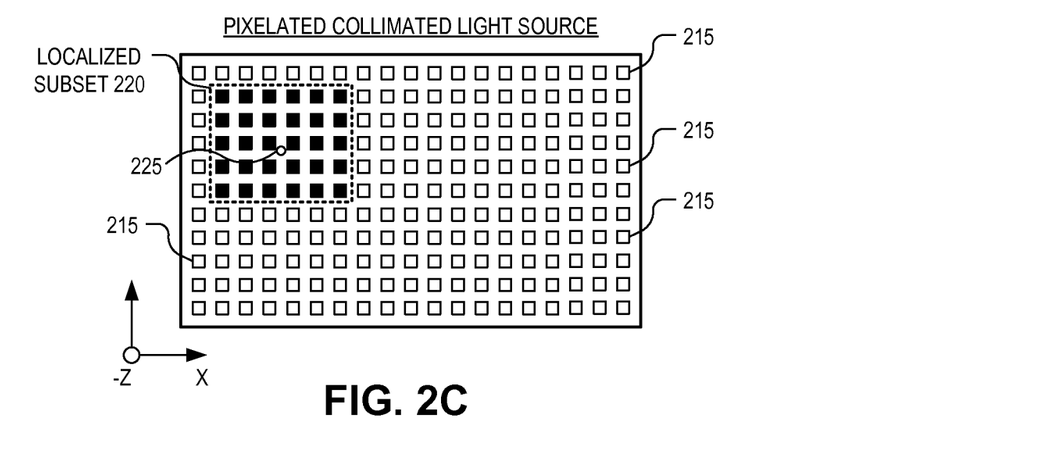

FIGS. 2A-C illustrate plan views of different emission patterns of collimated light 135 that can be emitted by different configurations of collimated light source 105. The embodiment of FIG. 2A illustrates how collimated light source 105 can be designed to emit a single large beam of collimated light 205. The embodiment of FIG. 2B illustrates how collimated light source 105 can be designed to emit rows (or columns) of collimated light 210. The embodiment of FIG. 2C illustrates how collimated light source 105 can be designed as a pixelated collimated light source that emits a 2D array of collimated light pixels 215. These emission patterns for collimated light 135 are directed into beam steering mechanism 110, which then directs the collimated light 135 at selectable angles (beam steering states) into eyebox 125 in a repetitious manner under the influence of synchronization controller 115.

Figure 3A:
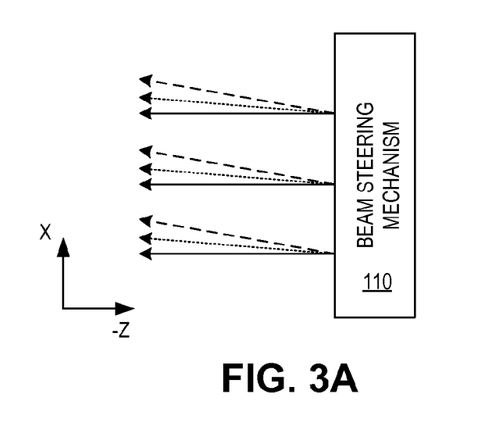
FIGS. 3A-3D illustrate how a beam steering mechanism operates to scan collimated light between beam steering states that each redirect the collimated light to a different angular direction, in accordance with an embodiment of the disclosure.
Figure 3B:
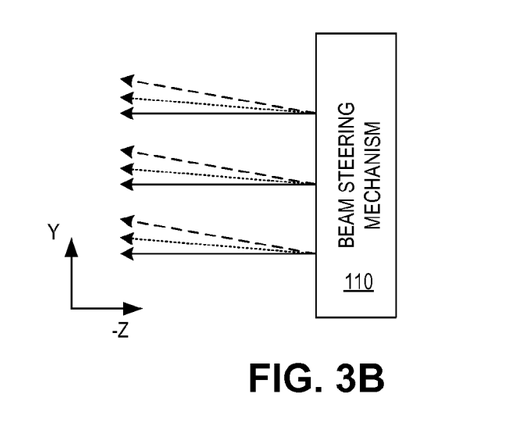
Figure 3C:
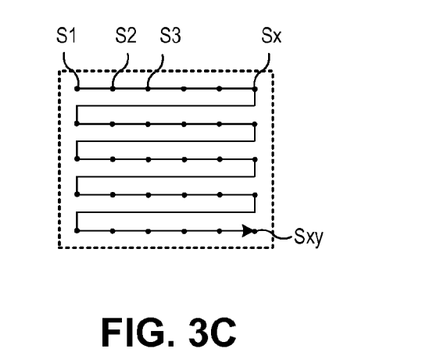

FIGS. 3A-3C illustrate how beam steering mechanism 110 operates to scan collimated light 135 between beam steering states that each redirect the collimated light 135 to a different angular direction, in accordance with an embodiment of the disclosure. FIGS. 3A and 3B illustrate how, in one embodiment, beam steering mechanism 110 can redirect the collimated light 135 in different directions along two orthogonal angular dimensions (e.g., x and y). Each angular direction corresponds to a different beam steering state. However, in each beam steering state, all collimated light 135 that is passed through beam steering mechanism 110 is redirected by the same angle to preserve the collimated characteristic of the light reaching eye 130 within eyebox 125. FIG. 3C illustrates how synchronization controller 115 manipulates beam steering mechanism 110 to raster scan through the beam steering states (i.e., S1 to Sxy). This raster scan pattern has the effect of scanning the collimated light 135 over eyebox 125 by sequentially cycling through the beam steering states. By quickly repeating the raster scan pattern illustrated in FIG. 3C, a constant image is perceived by eye 130.

Figure 3D:
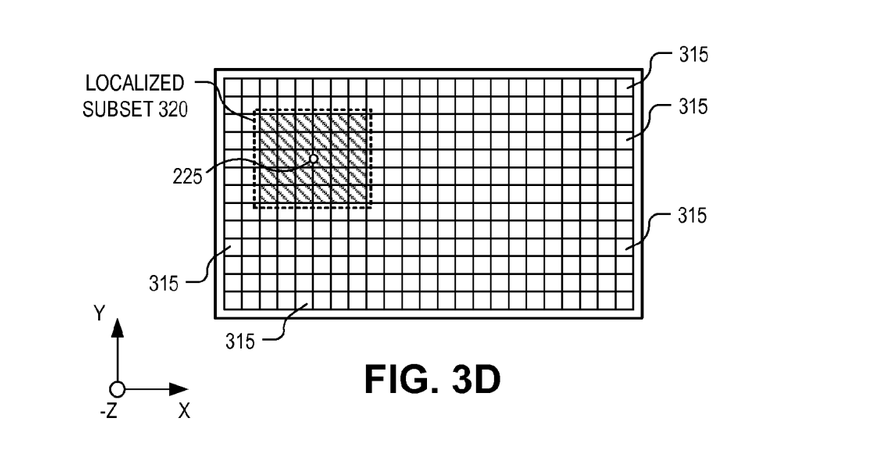
Figure 4:
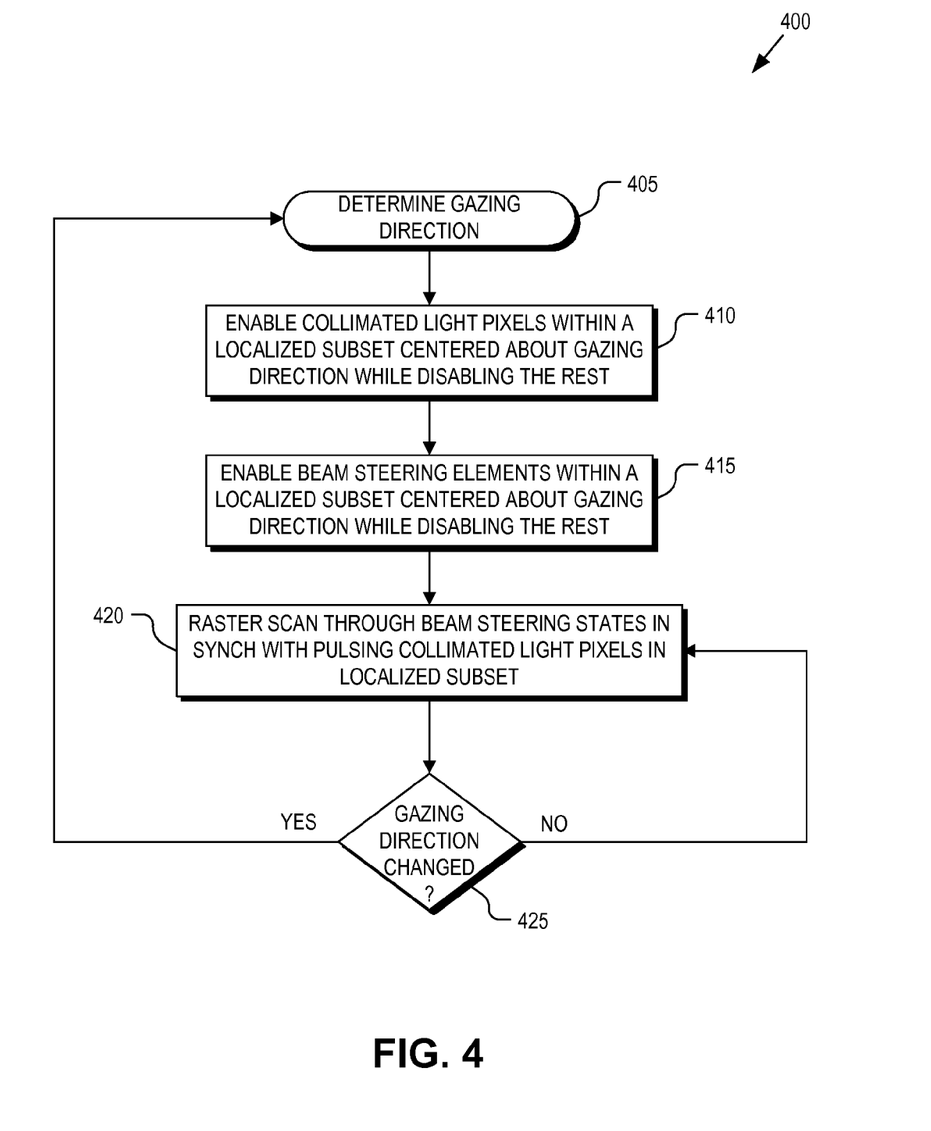
FIG. 4 is a flow chart illustrating a process of operation of the head-wearable display system, in accordance with an embodiment of the disclosure.

FIG. 4 is a flow chart illustrating a process 400 of operation of system 100 including the optional eye tracking feature, in accordance with an embodiment of the disclosure. The order in which some or all of the process blocks appear in process 400 should not be deemed limiting. Rather, one of ordinary skill in the art having the benefit of the present disclosure will understand that some of the process blocks may be executed in a variety of orders not illustrated, or even in parallel. Process 400 is described with reference to FIGS. 1, 2C, and 3D. FIG. 2C illustrates a planar view along the z-axis of a pixelated implementation of collimated light source 105. FIG. 3D is a planar view along the z-axis of a pixelated implementation of beam steering mechanism 110.

In a process block 405, the gazing direction of eye 130 is determined. The gazing direction is determined using eye tracking camera 120 to capture an image of eye 130. Eye tracking camera 120 may be implemented using a complementary metal-oxide-semiconductor ("CMOS") image sensor or charged coupled device ("CCD") image sensor that is mounted in a position to have a constant view of eye 130. The eye image is then analyzed by synchronization controller 115 to determine the direction in which eye 130 is gazing. In one embodiment, gazing direction may be calculated based upon the position of the iris in the captured image.

When collimated light source 105 is implemented as a pixelated collimated light source (illustrated in FIG. 2C), determining the gazing direction can be used to dynamically translate eyebox 125 in real-time to effectively increase the FOV of system 100. Returning to FIG. 4, once the gazing direction has been determined, collimated light pixels 215 within a localized subset 220 surrounding gazing direction 225 are enabled while collimated light pixels 215 outside of localized subset 220 are disabled (process block 410). Thus, collimated light pixels 215 within localized subset 220 are synchronously enabled to selectively emit light under the control of synchronization controller 115 while collimated light pixels 215 outside of localized subset 220 are disabled and do not emit light.

Similarly, referring to FIG. 3D, a localized subset 320 of beam steering elements 315 within beam steering mechanism 110 are also enabled while beam steering elements 315 outside of localized subset 320 are disabled (process block 415). The localized subset 320 of beam steering elements 315 are those elements that are optically aligned with collimated light pixels 215 within localized subset 220. Enabling beam steering elements 315 within localized subset 320 means these localized beam steering elements are operated to repetitiously scan through the beam steering states (e.g., S1 through Sxy). Correspondingly, disabling beam steering elements 315 outside the localized subset 320 means those elements are set to a fixed beam steering state so as not to angularly scan passing light through a sequence of angularly distinct directions. In one embodiment, disabling beam steering elements 315 sets them to a beam steering state that does not alter the direction of incident light. Thus, in an embodiment where beam steering mechanism 110 and collimated light source 105 are transmissive elements in a see-through display, ambient scene light can pass through these elements outside of localized subsets 220 and 320 without being washed out by collimated light 135 or distorted by beam steering mechanism 110.

In a process block 415, beam steering elements 315 within localized subset 320 repetitiously scan through the beam steering states (e.g., S1 through Sxy). This scanning sequentially redirects collimated light 135 through the sequence of angularly distinct directions provided by beam steering states S1 through Sxy.

If the user's gazing direction remains stationary (decision block 425), then the image continues to be raster scanned across eyebox 125 in process block 420. However, if the user's gazing direction changes (decision block 425), then process 400 loops back to process block 405 where the gazing direction is again re-determined. Thus, synchronization controller 115 controls collimated light source 105 and beam steering mechanism 110 to translate localized subsets 220 and 320 to follow the gazing direction of the user in real-time based upon feedback from eye tracking camera 120 thereby increasing the dynamic FOV of system 100.

Process 400 describes operation of display system 100 using eye tracking with localized beam steering and pixel light emission. However, other embodiments of system 100 may be implemented without eye tracking and without constraining the beam steering and/or pixel light emission to localized areas surrounding the gazing direction 225.

Figure 5:
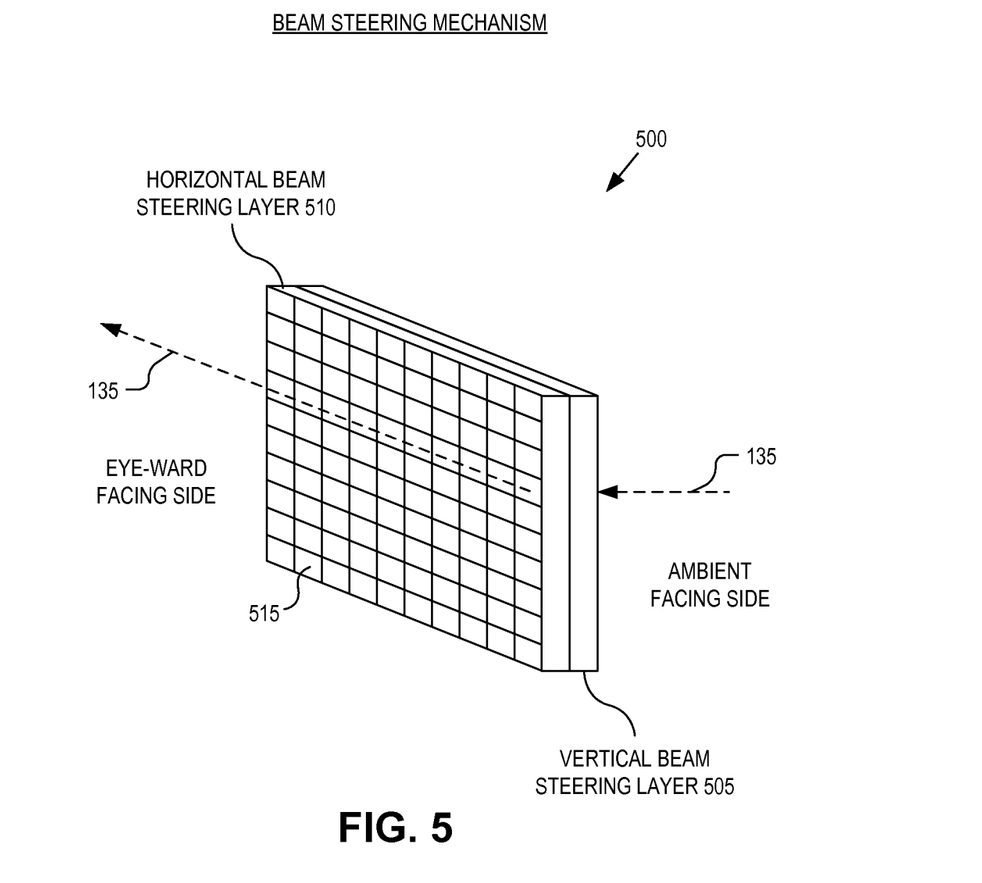
FIG. 5 illustrates a beam steering mechanism implemented using two-dimensional arrays of controllable beam steering prisms, in accordance with an embodiment of the disclosure.

FIG. 5 illustrates a beam steering mechanism 500 implemented using two layers of 2D arrays of controllable beam steering prisms, in accordance with an embodiment of the disclosure. Beam steering mechanism 500 is one possible implementation of beam steering mechanism 110. The illustrated embodiment of beam steering mechanism 500 includes a vertical beam steering layer 505 and a horizontal beam steering layer 510. Each beam steering layer 505 or 510 includes a 2D array of beam steering elements 515.

Each beam steering element 515 operates as an adjustable prism that can independently bend collimated light 135 incident on its ambient facing side to a selectable angle on its eye-ward facing side. In one embodiment, beam steering elements 515 are implemented using electrowetting microprisms. Electrowetting micro-prisms include an oil filled cavity surrounded on either side by electrostatic plates that can manipulate the shape of the oil in the cavity thereby creating an adjustable prism. Electrowetting micro-prisms have been found to be capable of implementing a beam steering raster in excess of 1 kHz, which is in a range that is adequate to implement beam steering mechanism 110. In the illustrated embodiment, two layers of beam steering elements 515 are used to achieve beam steering in two orthogonal angular directions. Thus, vertical beam steering layer 505 includes prisms that can be manipulated under control of synchronization controller 115 to bend collimated light 135 along a vertical angular axis and horizontal beam steering layers 510 includes prisms that can be manipulated under control of synchronization controller 115 to bend collimated light 135 along a horizontal angular axis.

In one embodiment, it has been calculated that a steering response frequency of 2.765 kHz is adequate to operate beam steering mechanism 500 having 276 independent beam steering states. Of course, other steering frequencies and number of steering states may be implemented. If it is desired to arrange the beam steering states into a field of view ("FOV") having a 4:3 ratio, then 276 beam steering states roughly provides 19 x-axis steering states and 14 y-axis steering states. A derivation of why 276 beam steering states is deemed to be adequate follows below.

The human eye has an angular resolution of approximately 1 arcmin, (below which it cannot discern angular separations), a FOV of approximately 2 degrees at any given moment (without moving the eye), and a response rate of about 30 Hz. Accordingly, a display that provides 18 to 20 arcmin angular resolution, 8 degrees of instantaneous diagonal FOV, and a refresh rate of 10 Hz can be deemed acceptable for certain uses. An angular resolution of 18 to 20 arcmin is selected as a value that provides adequate angular resolution while not resulting in display features that are so small that diffraction unduly compromises the image. With these assumptions, a 4:3 ratio image has:

$x\text{FOV} = 6.4$ degrees, and $y\text{FOV} = 4.8$ degrees.

For an eye relief (dimension ER in FIG. 1) of 18 mm and an eyebox diameter (dimension ED in FIG. 1) of 8 mm, the dimensions of the beam steering device are:

$Lx = 2 * \tan(x\text{FOV}) * ER + ED = 12.038$ mm, and $Ly = 2 * \tan(y\text{FOV}) * ER + ED = 11.023$ mm.

This results in the following number of beam steering states:

$$xSteeringStates = \frac{xFOV}{AngularResolution} = 19.2,$$

$$ySteeringStates = \frac{yFOV}{AngularResolution} = 14.4, \text{ and}$$

$$TotalSteeringStates = 276.48.$$

It should be appreciated that other mechanisms may be used to implement beam steering mechanism 110. For example, in another embodiment, beam steering mechanism 110 may be implemented using a liquid crystal polarization grating. Furthermore, beam steering mechanism 110 need not be implemented as a pixelated structure, but rather may be implemented as a single continuous structure since all collimated light 135 is bent in the same direction by the same angle at a given time. However, a non-pixelated embodiment may require additional optical elements to counter-act beam steering for a see-through display.

Figure 6A:
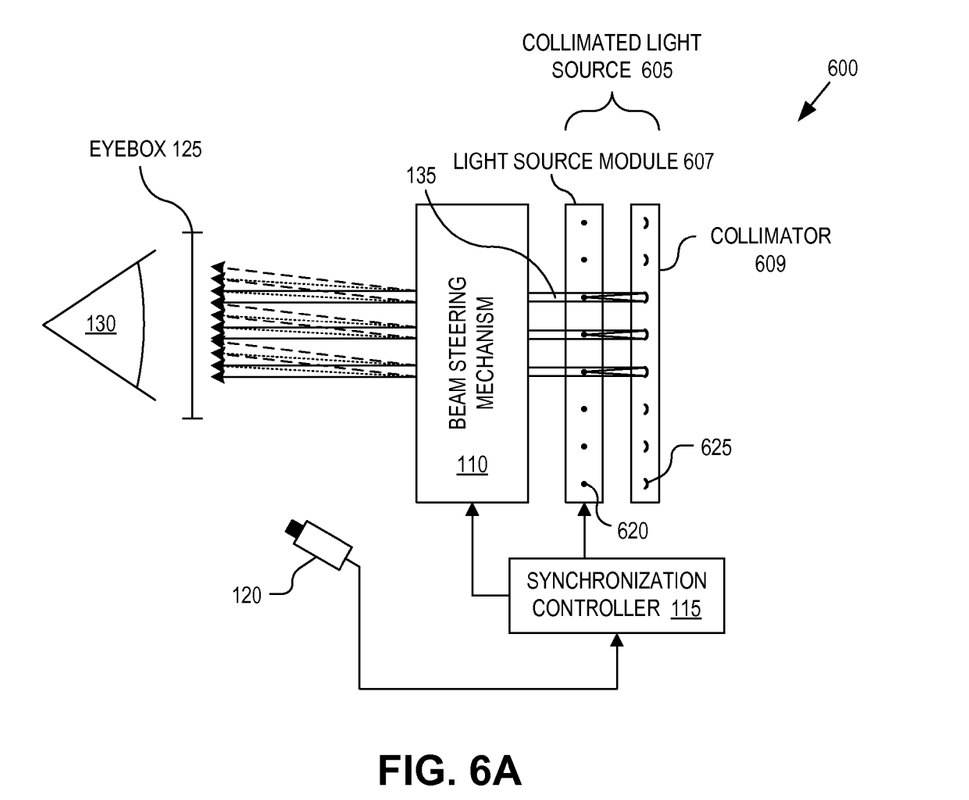
FIGS. 6A-B illustrate a head-wearable display system implemented with a mirror based collimator, in accordance with an embodiment of the disclosure.

FIG. 6A illustrates a head-wearable display system 600 implemented with a mirror based collimator, in accordance with an embodiment of the disclosure. System 600 is one possible implementation of system 100 illustrated in FIG. 1. The illustrated embodiment of system 600 includes beam steering mechanism 110, a collimated light source 605, synchronization controller 115, and optionally eye tracking camera 120. The illustrated embodiment of collimated light source 605 includes a light source module 607 and a collimator 609.

Collimated light source 605 is a pixelated light source that generates collimated light pixels 135. Light source module 607 includes a 2D array of divergent light sources 620 (e.g., LEDs, OLED, quantum dots, etc.), which are each aligned with a corresponding micro-mirror 625 within collimator 609. In one embodiment, each divergent light source 620 is positioned at the focal point of a corresponding micro-mirror 625.

Figure 6B:
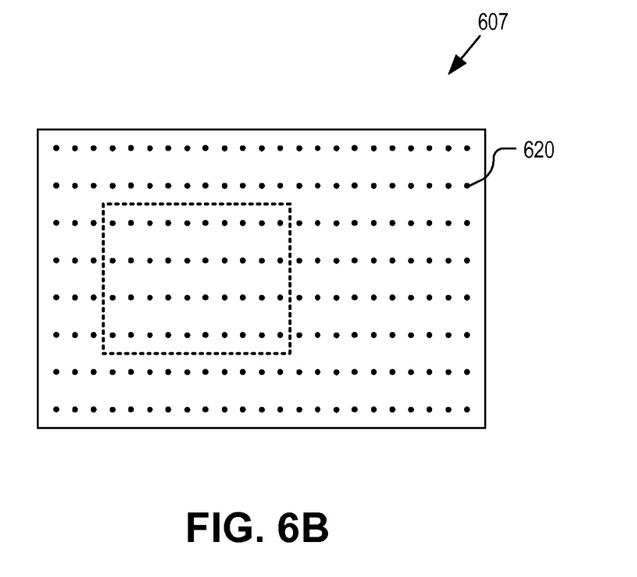

The divergent light emitted by a given divergent light source 620 is reflected and collimated by a corresponding micro-mirror 625 of collimator 609. The reflected and collimated light is directed back towards beam steering mechanism 110 as collimated light 135. Thus, collimated light source 605 is a 2D pixelated light source. FIG. 6B illustrates a plan view of light source module 607.

Figure 7A:
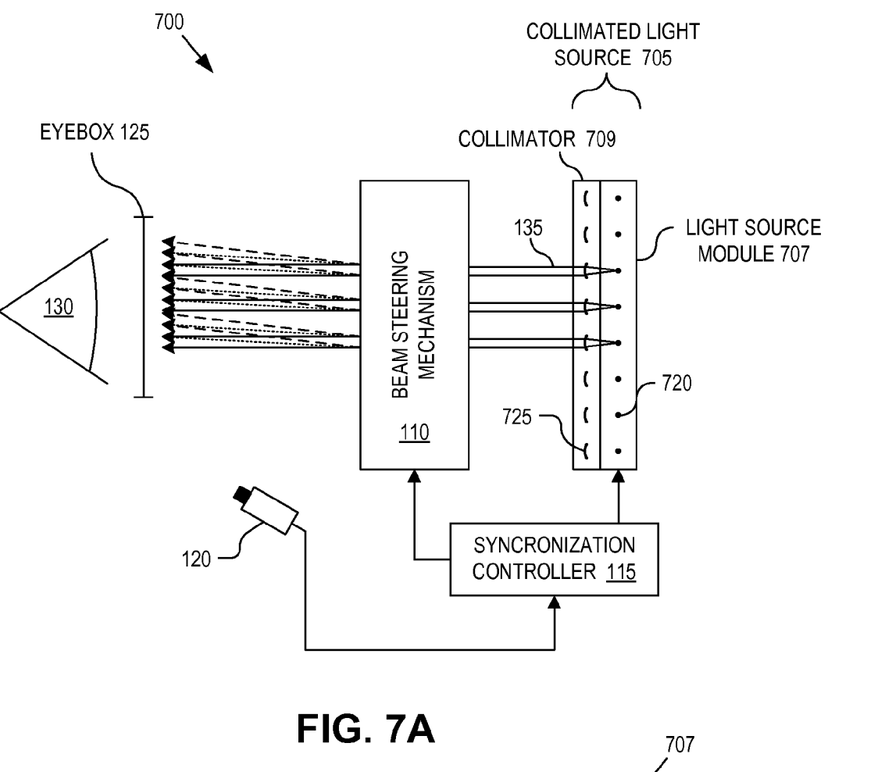
FIGS. 7A-B illustrate a head-wearable display system implemented with a micro-lens array based collimator, in accordance with an embodiment of the disclosure.

FIG. 7A illustrates a head-wearable display system 700 implemented with a micro-lens array based collimator, in accordance with an embodiment of the disclosure. System 700 is one possible implementation of system 100 illustrated in FIG. 1. The illustrated embodiment of system 700 includes beam steering mechanism 110, a collimated light source 705, synchronization controller 115, and optionally eye tracking camera 120. The illustrated embodiment of collimated light source 705 includes a light source module 707 and a collimator 709.

Collimated light source 705 is a pixelated light source that generates collimated light pixels 135. Light source module 707 includes a 2D array of divergent light sources 720 (e.g., LEDs, OLED, quantum dots, etc.), which are each aligned with a corresponding micro-lens 725 within collimator 709. In one embodiment, each divergent light source 720 is positioned at the focal point of a corresponding micro-lens 725.

Figure 7B:
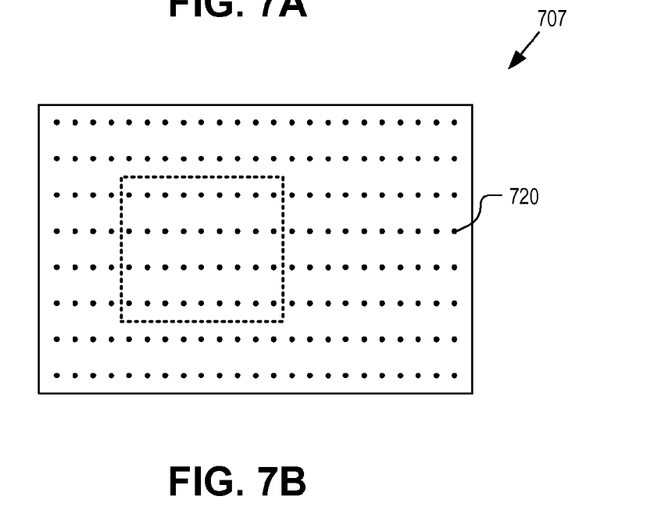

The divergent light emitted by a given divergent light source 720 is directed to and collimated by a corresponding micro-lens 725 and output as collimated light 135. Thus, collimated light source 705 is a 2D pixelated light source. FIG. 7B illustrates a plan view of light source module 707.

Figure 8A:
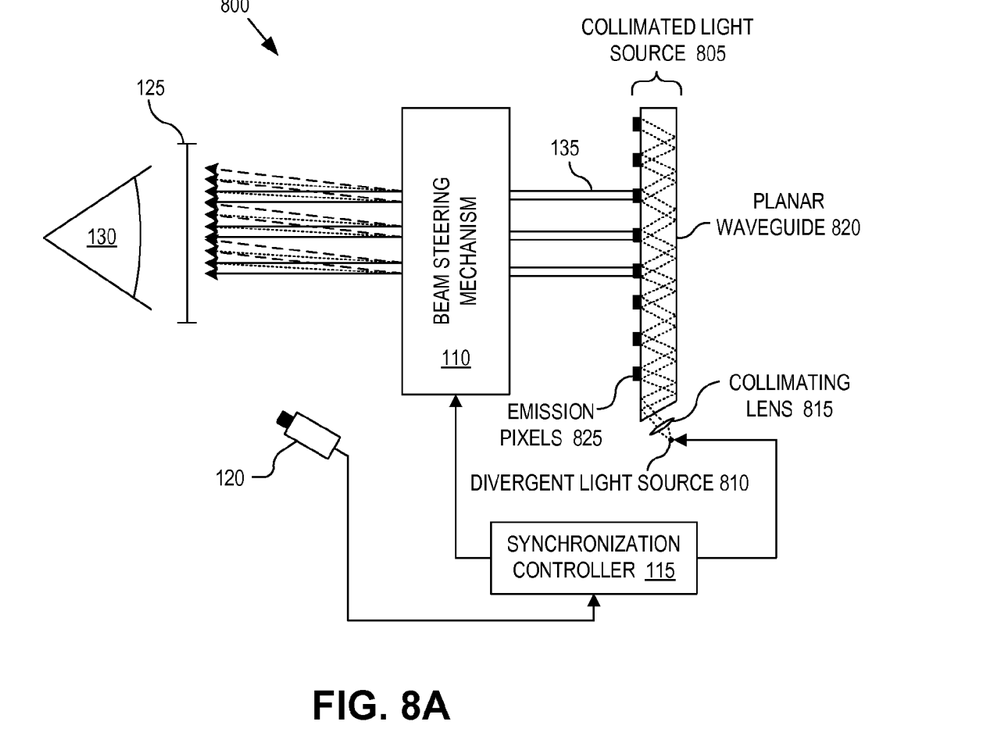
FIGS. 8A-B illustrate a head-wearable display system implemented with a planar lightguide, in accordance with an embodiment of the disclosure.

FIG. 8A illustrates a head-wearable display system 800 implemented with a planar lightguide, in accordance with an embodiment of the disclosure. System 800 is one possible implementation of system 100 illustrated in FIG. 1. The illustrated embodiment of system 800 includes beam steering mechanism 110, a collimated light source 805, synchronization controller 115, and optionally eye tracking camera 120. The illustrated embodiment of collimated light source 805 includes a divergent light source 810, a collimating lens 815, a planar lightguide 820, and emission pixels 825.

During operation, divergent light source 810 (e.g., LED, quantum dot, etc.) emits divergent light into collimating lens 815, which collimates the light before entering into planar lightguide 820. The collimated light is guided within planar lightguide 820 via total internal reflection, expanding the collimated light beam out along its length. In one embodiment, emission pixels 825 are switchable Bragg gratings ("SBG") that are operated under the influence of synchronization controller 115. SBG can be operated to either maintain the TIR characteristic of planar lightguide 820 so that the collimated light continues to propagate within the lightguide, or defeats the TIR condition permitting the collimated light to selectively escape as collimated light 135 along a designed trajectory. In one embodiment, the trajectory may be designed to be substantially normal to the emission surface of planar lightguide 820.

Figure 8B:
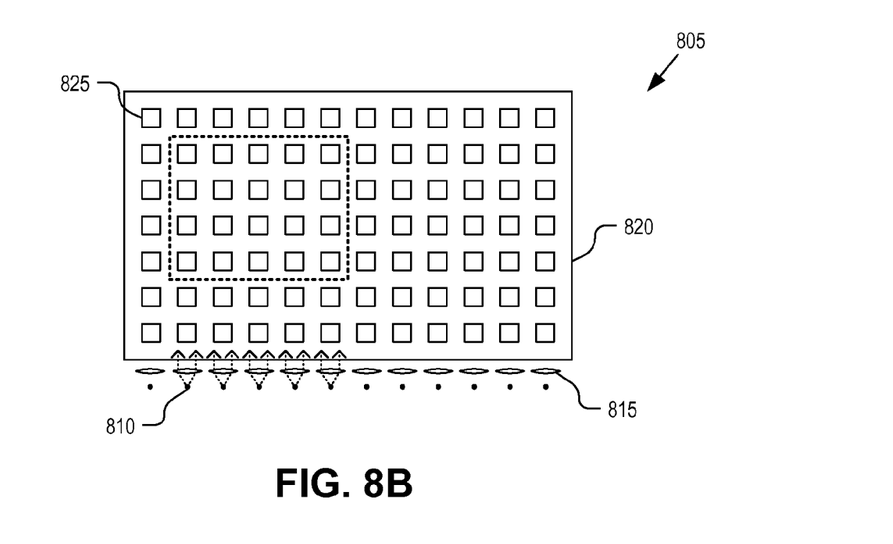

FIG. 8B illustrates a plan view of planar lightguide 820 including a 2D array of emission pixels 825, in accordance with an embodiment of the disclosure. In this 2D pixelated embodiment, a linear array of divergent light sources 810 and collimating lenses 815 may line the side of planar lightguide 820. Of course, emission pixels 825 may be disposed over the emission side of planar lightguide 820 using a variety of other patterns. For example, emission pixels 825 can be sized and oriented to implement any of the emission patterns illustrated in FIG. 2A, 2B, or 2C. Although FIG. 8B illustrates an array of divergent light sources 810 and collimating lenses 815, other embodiments may use a single light source and a single collimator to inject light into planar lightguide 820.

Figure 9:
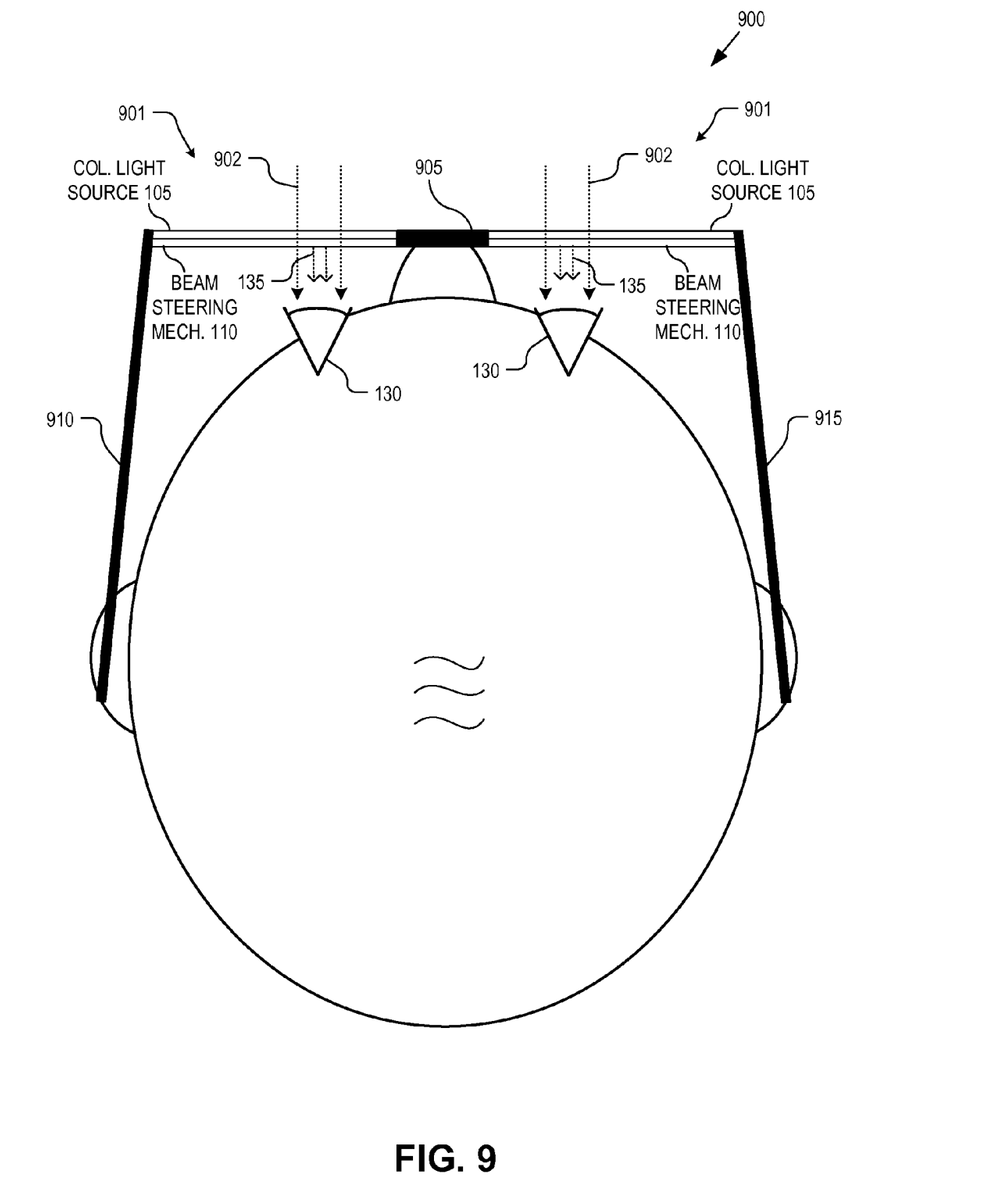
FIG. 9 is a top view illustration of a binocular head wearable display using two see-through displays that each include a collimated light source synchronized to a beam steering mechanism, in accordance with an embodiment of the disclosure.

FIG. 9 is a top view illustration of a binocular head wearable display 900 using two see-through displays 901 that each include a collimated light source synchronized to a beam steering mechanism, in accordance with an embodiment of the disclosure. Each see-through display 901 may be implemented with various embodiments or combinations of systems 100, 600, 700, or 800 as discussed herein. The see-through displays 900 are mounted to a frame assembly, which includes a nose bridge 905, left ear arm 910, and right ear arm 915. Although FIG. 9 illustrates a binocular embodiment, display 900 may also be implemented as a monocular display.

The see-through displays 901 are secured into an eye glass arrangement or head wearable display that can be worn on the head of a user. The left and right ear arms 910 and 915 rest over the user's ears while nose bridge 905 rests over the user's nose. The frame assembly is shaped and sized to position each display in front of a corresponding eye 125 of the user. Other frame assemblies having other shapes may be used (e.g., a visor with ear arms and a nose bridge support, a single contiguous headset member, a headband, goggles type eyewear, etc.).

The illustrated embodiment of display 900 is capable of displaying an augmented reality to the user. Each see-through display 901 permits the user to see a real world image via external scene light 902. Left and right (binocular embodiment) image light (collimated light 135) is generated by collimated light source 105 and scanned across the user's eye 130 via beam steering mechanism 110. The image light is seen by the user as a virtual image in front of or superimposed over external scene light 902. In some embodiments, external scene light 902 may be fully, partially, or selectively blocked to provide sun shading characteristics and increase the contrast of the image light.

The processes explained above may be described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An apparatus for a head-wearable display, comprising:
a collimated light source coupled to selectively emit collimated light, wherein the collimated light source comprises a pixelated light source that generates a two-dimensional ("2D") array of collimated light pixels;
a beam steering mechanism optically coupled to receive the collimated light as the 2D array of collimated light pixels emitted from the collimated light source and to angularly scan the 2D array of collimated light pixels between beam steering states that each redirect the 2D array of collimated light pixels to a different angular direction along at least one angular dimension, wherein the beam steering mechanism scans the 2D array of collimated light pixels across an eyebox, wherein the beam steering mechanism bends the 2D array of collimated light pixels by a same angle at a given time for all collimated light pixels output from the collimated light source at the given time; and a synchronization controller coupled to the collimated light source and the beam steering mechanism to synchronize selective emission of the collimated light from the collimated light source with the beam steering states of the beam steering mechanism to repetitiously draw an image in the eyebox.

2. The apparatus of claim 1, wherein the beam steering mechanism is coupled to angularly scan between beam steering states angularly separated along two dimensions.

3. The apparatus of claim 2, wherein the beam steering mechanism is coupled to raster scan through the steering states angularly separated along the two dimensions under the influence of the synchronization controller.

4. The apparatus of claim 1, further comprising:
an eye tracking camera positioned to capture an eye image of an eye within the eyebox,
wherein the synchronization controller is coupled to the eye tracking camera to determine a gazing direction based upon the eye image and to selectively enable the collimated light pixels only within a localized subset of the pixelated light source based upon the determined gazing direction, wherein the localized subset is less than all of the collimated light pixels within the pixelated light source.

5. The apparatus of claim 4, wherein the beam steering mechanism comprises a two-dimensional array of beam steering elements and wherein a subset of the beam steering elements localized about the gazing direction are enabled by the synchronization controller to angularly steer the collimated light pixels while the beam steering elements outside of the subset of the beam steering elements are disabled and do not angularly scan passing light.

6. The apparatus of claim 1, wherein the beam steering mechanism comprises:
a first layer having a first two-dimensional ("2D") array of electrowetting prisms coupled to beam steer along a first angular axis; and
a second layer having a second 2D array of electrowetting prisms coupled to beam steer along a second angular axis orthogonal to the first angular axis.

7. The apparatus of claim 1, wherein the beam steering mechanism comprises a liquid crystal polarization grating.

8. The apparatus of claim 1, wherein the collimated light source and the beam steering mechanism are see-through such that a user can view ambient scene light through the collimated light source and the beam steering mechanism.

9. The apparatus of claim 1, wherein the collimated light source comprises:
a collimator including a two-dimensional ("2D") array of micro-mirrors; and
a light source module including a 2D array of divergent light sources each optically aligned with a corresponding one of the micro-mirrors, wherein the light source module is disposed between the collimator and the beam steering mechanism such that divergent light emitted from the light source module towards the collimator is reflected back towards the beam steering mechanism through the light source module as collimated light pixels.

10. The apparatus of claim 1, wherein the collimated light source comprises:
a collimator including a two-dimensional ("2D") array of transmissive micro-lenses; and
a light source module including a 2D array of divergent light sources each optically aligned with a corresponding one of the micro-mirrors, wherein the collimator is disposed between the light source module and the beam steering mechanism such that divergent light emitted from the light source module is collimated upon passing through the collimator to form collimated light pixels.

11. The apparatus of claim 1, wherein the collimated light source comprises:
a divergent light source coupled to generate divergent light;
a collimating lens positioned to collimate the divergent light into the collimated light;
a lightguide for guiding the collimated light received from the collimating lens; and
one or more emission pixels disposed along a surface of the lightguide, wherein the one or more emission pixels are coupled to the synchronization controller to selectively emit the collimated light in synch with the angularly scanning of the beam steering mechanism under the influence of the synchronization controller to draw the image in the eyebox.

12. The apparatus of claim 11, wherein the one or more emission pixels comprise one or more switchable Bragg gratings configured to selectively emit the collimated light from the lightguide along a direction that is substantially normal to the surface of the lightguide.

13. The apparatus of claim 12, wherein the lightguide comprises a planar lightguide, and wherein the head-wearable display further comprises:
a linear array of divergent light sources;
a linear array of collimating lenses; and
a two-dimensional array of emission pixels disposed along the surface of the planar lightguide.

14. The apparatus of claim 1, wherein the collimated light source comprises:
a two-dimensional ("2D") pixelated array of divergent light sources; and
a collimator disposed in an optical path between the two-dimensional pixelated array of divergent light sources and the beam steering mechanism.

15. The apparatus of claim 14, wherein the collimator comprises one of a 2D array of micro-lenses or photonic crystals implementing a super-collimation effect.

16. A method of operation of a head-worn display, comprising:
selectively emitting collimated light as a two-dimensional ("2D") array of collimated light pixels;
directing the 2D array of collimated light pixels through a beam steering mechanism positioned in front of an eye of a user;
angularly scanning the 2D array of collimated light pixels into an eyebox, wherein the 2D array of collimated light pixels is angularly scanned across beam steering states angularly separated along two dimensions, wherein the 2D array of collimated light pixels are bent by a same angle at a given time for all collimated light pixels output from the collimated light source at the given time when angularly scanned across the beam steering states; and
synchronizing the selective emission of the collimated light with the angular scanning of the collimated light to repetitiously draw the image in the eyebox.

17. The method of claim 16, wherein the collimated light is sequentially raster scanned between the beam steering states such that all the collimated light emitted during a given beam steering state is redirected by a common angle and each beam steering state is associated with a different angle.

18. The method of claim 17, further comprising:
capturing an eye image of an eye within the eyebox;
determining a gazing direction based upon the eye image; and
selectively enabling the collimated light pixels only within a localized subset of the collimated light pixels based upon the determined gazing direction, wherein the localized subset is less than all of the collimated light pixels.

19. The method of claim 18, further comprising:
enabling a subset of the beam steering elements within the beam steering mechanism localized about the gazing direction to angularly steer the collimated light pixels; and
disabling the beam steering elements outside of the subset of the beam steering elements such that those beam steering elements do not angularly scan ambient light.

20. A head-wearable display, comprising:
a see-through display including:
a collimated light source coupled to selectively emit collimated light as a two-dimensional ("2D") array of collimated light pixels;
a beam steering mechanism optically coupled to receive the 2D array of collimated light pixels emitted from the collimated light source and to angularly scan the 2D array of collimated light pixels between beam steering states that each redirect the 2D array of collimated light pixels to a different angular direction spread across two angular dimensions, wherein the beam steering mechanism scans the 2D array of collimated light pixels across an eyebox, wherein the beam steering mechanism bends the 2D array of collimated light pixels by a same angle at a given time for all collimated light pixels output from the collimated light source at the given time; and
a synchronization controller coupled to the collimated light source and the beam steering mechanism to synchronize selective emission of the collimated light from the collimated light source with the beam steering states of the beam steering mechanism to repetitiously draw an image in the eyebox; and
a frame assembly to support the see-through display for wearing on a head of a user with the beam steering mechanism positioned in front of and facing an eye of the user.

21. The head-wearable display of claim 20, wherein the collimated light source comprises a pixelated light source that generates the two-dimensional ("2D") array of collimated light pixels.

22. The head-wearable display of claim 21, further comprising:
an eye tracking camera positioned to capture an eye image of an eye within the eyebox,
wherein the synchronization controller is coupled to the eye tracking camera to determine a gazing direction based upon the eye image and to selectively enable the collimated light pixels only within a localized subset of the pixelated light source based upon the determined gazing direction, wherein the localized subset is less than all of the collimated light pixels within the pixelated light source.

23. The head-wearable display of claim 20, wherein the collimated light source comprises:
a collimator including a two-dimensional ("2D") array of micro-mirrors; and
a light source module including a 2D array of divergent light sources each optically aligned with a corresponding one of the micro-mirrors, wherein the light source module is disposed between the collimator and the beam steering mechanism such that divergent light emitted from the light source module towards the collimator is reflected back towards the beam steering mechanism through the light source module as collimated light pixels.

24. The head-wearable display of claim 20, wherein the collimated light source comprises:
a collimator including a two-dimensional ("2D") array of transmissive micro-lenses; and
a light source module including a 2D array of divergent light sources each optically aligned with a corresponding one of the micro-lenses, wherein the collimator is disposed between the light source module and the beam steering mechanism such that divergent light emitted from the light source module is collimated upon passing through the collimator to form collimated light pixels.

25. The head-wearable display of claim 20, wherein the collimated light source comprises:
a divergent light source coupled to generate divergent light;
a collimating lens positioned to collimate the divergent light into the collimated light;
a lightguide for guiding the collimated light received from the collimating lens; and
one or more emission pixels disposed along a surface of the lightguide, wherein the one or more emission pixels are coupled to the synchronization controller to selectively emit the collimated light in synch with the angularly scanning of the beam steering mechanism under the influence of the synchronization controller to draw the image in the eyebox.

26. An apparatus for a head-wearable display, comprising:
a collimated light source coupled to selectively emit collimated light, wherein the collimated light source comprises a pixelated light source that generates a two-dimensional ("2D") array of collimated light pixels;
a beam steering mechanism optically coupled to receive the collimated light as the 2D array of collimated light pixels emitted from the collimated light source and to angularly scan the 2D array of collimated light pixels between beam steering states that each redirect the 2D array of collimated light pixels to a different angular direction along at least one angular dimension, wherein the beam steering mechanism scans the 2D array of collimated light pixels across an eyebox;
a synchronization controller coupled to the collimated light source and the beam steering mechanism to synchronize selective emission of the collimated light from the collimated light source with the beam steering states of the beam steering mechanism to repetitiously draw an image in the eyebox; and
an eye tracking camera positioned to capture an eye image of an eye within the eyebox,
wherein the synchronization controller is coupled to the eye tracking camera to determine a gazing direction based upon the eye image and to selectively enable the collimated light pixels only within a localized subset of the pixelated light source based upon the determined gazing direction, wherein the localized subset is less than all of the collimated light pixels within the pixelated light source.

27. A method of operation of a head-worn display, comprising:
- selectively emitting collimated light as a two-dimensional ("2D") array of collimated light pixels;
- directing the 2D array of collimated light pixels through a beam steering mechanism positioned in front of an eye of a user;
- angularly scanning the 2D array of collimated light pixels into an eyebox, wherein the 2D array of collimated light pixels is angularly scanned across beam steering states angularly separated along two dimensions;
- synchronizing the selective emission of the collimated light with the angular scanning of the collimated light to repetitiously draw an image in the eyebox;
- capturing an eye image of an eye within the eyebox;
- determining a gazing direction based upon the eye image; and
- selectively enabling the collimated light pixels only within a localized subset of the collimated light pixels based upon the determined gazing direction, wherein the localized subset is less than all of the collimated light pixels.

\* \* \* \* \*